United States Patent
Bund et al.

(10) Patent No.: US 11,499,842 B2
(45) Date of Patent: Nov. 15, 2022

(54) POSITION DETECTION SYSTEM AND METHOD FOR DETECTING A MOVEMENT OF A MACHINE

(71) Applicant: Robert Bosch GmbH, Stuttgart (DE)

(72) Inventors: Gerhard Bund, Lohr-Rodenbach (DE); Stephanie Stollberger, Uettingen (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 16/571,469

(22) Filed: Sep. 16, 2019

(65) Prior Publication Data
US 2020/0088548 A1    Mar. 19, 2020

(30) Foreign Application Priority Data
Sep. 18, 2018  (DE) ............. 10 2018 215 783.9

(51) Int. Cl.
*G01D 5/16*    (2006.01)
*G01D 5/14*    (2006.01)

(52) U.S. Cl.
CPC ............. *G01D 5/16* (2013.01); *G01D 5/145* (2013.01)

(58) Field of Classification Search
CPC .................. G01D 5/16; G01D 5/145
See application file for complete search history.

(56) References Cited

U.S. PATENT DOCUMENTS

| | | | | |
|---|---|---|---|---|
| 5,097,209 A * | 3/1992 | Santos | .......... | F02P 7/0677 324/207.2 |
| 5,646,523 A * | 7/1997 | Kaiser | .......... | G01D 5/2497 341/15 |
| 6,104,185 A * | 8/2000 | Lamm | .......... | G01P 3/487 324/207.12 |
| 6,498,409 B1 * | 12/2002 | Collier-Hallman | .... | G01D 5/145 310/68 B |
| 6,826,499 B2 * | 11/2004 | Colosky | .......... | H02P 6/182 702/85 |

(Continued)

FOREIGN PATENT DOCUMENTS

WO  97/16736 A2  5/1997
WO  97/23763 A1  7/1997

OTHER PUBLICATIONS

UK Search Report corresponding to UK Patent Application No. GB1913283.6, dated Mar. 12, 2020 (3 pages).

*Primary Examiner* — Walter L Lindsay, Jr.
*Assistant Examiner* — Milton Gonzalez
(74) *Attorney, Agent, or Firm* — Maginot, Moore & Beck LLP

(57) ABSTRACT

A position detection system for detecting a movement of a machine includes a first and a second position sensor and an evaluation device. The first position sensor is configured to detect a change in a first magnetic field generated by the movement of the machine. The second position sensor is configured to detect a change in a second magnetic field, which differs from the first magnetic field and is generated by the movement of the machine. A detection result from the second position sensor has a lower resolution of a position of an element of the machine to be determined than a detection result from the first position sensor. The evaluation device is configured to evaluate the detection result from the first position sensor and/or the detection result from the second position sensor to determine the position of the element of the machine.

17 Claims, 3 Drawing Sheets

(56) References Cited

U.S. PATENT DOCUMENTS

| | | | | |
|---|---|---|---|---|
| 6,831,820 B2* | 12/2004 | Schwesig | ........... | G05B 19/0428 |
| | | | | 200/179 |
| 6,907,373 B2* | 6/2005 | Walter | ................. | G01D 18/001 |
| | | | | 702/104 |
| 7,023,203 B2* | 4/2006 | Miyashita | ............... | G01D 5/145 |
| | | | | 324/207.25 |
| 7,999,537 B2* | 8/2011 | LaCroix | ................ | G01D 5/145 |
| | | | | 324/207.25 |
| 8,058,868 B2* | 11/2011 | Santos | .................. | G01D 5/145 |
| | | | | 324/207.25 |
| 8,649,906 B2* | 2/2014 | Bischoff | ................. | G01L 3/108 |
| | | | | 700/258 |
| 8,981,766 B2* | 3/2015 | Burkhardt | .......... | G01D 5/24438 |
| | | | | 324/207.11 |
| 9,035,647 B2* | 5/2015 | Gustafsson | ........... | H03M 1/485 |
| | | | | 324/207.25 |
| 9,702,742 B2* | 7/2017 | Reimann | ................ | G01D 21/00 |
| 9,746,492 B2* | 8/2017 | Rauh | ..................... | G01P 21/00 |
| 9,759,737 B2* | 9/2017 | Dunbar | ............... | G01D 5/2451 |
| 9,874,609 B2* | 1/2018 | Rasbornig | .............. | B60T 8/885 |
| 2015/0028858 A1 | 1/2015 | Putinier | | |
| 2017/0254676 A1 | 9/2017 | Bogos et al. | | |
| 2018/0231400 A1* | 8/2018 | Okumura | ............. | G01D 5/2451 |
| 2019/0285439 A1* | 9/2019 | Santos | ................. | G01D 5/2458 |
| 2020/0047805 A1* | 2/2020 | Oka | .................... | B62D 15/0235 |

* cited by examiner

POSITION DETECTION SYSTEM AND METHOD FOR DETECTING A MOVEMENT OF A MACHINE

This application claims priority under 35 U.S.C. § 119 to patent application no. DE 10 2018 215 783.9, filed on Sep. 18, 2018 in Germany, the disclosure of which is incorporated herein by reference in its entirety.

The disclosure relates to a position detection system and to a method for detecting a movement of a machine, for example a rotating machine, in particular for a synchronous motor.

BACKGROUND

Machines, for example electrical machines, motors, generators, rotating machines, linear machines etc., are used in many fields of technology to cause objects to move, for example, to generate electrical energy, etc. Depending on the application, it is important to know, during operation of the machine and/or for the activation of the machine, the position in which the machine is situated in order to be able to carry out a defined movement with the aid of the machine during operation.

Such machines, in particular synchronous motors, need the determined position to control the location of an element driven by the machine and to enable the optimum commutation angle for controlling the power electronics. So that this is possible without further activities after switch-on, the position must be clear within one revolution of the machine.

The problem is that there is little space in the machine for the position detection system, that the position detection system is intended to be robust with respect to mechanical loads and environmental influences, is intended to be economical to produce, is intended to provide a high quality and a high resolution and is intended to be able to safely form the position for personal protection.

SUMMARY

The object of the disclosure is to provide a position detection system and a method for detecting a movement of a machine, which can be used to solve the problems mentioned above. In particular, the intention is to provide a position detection system and a method for detecting a movement of a machine, which can be used to implement a robust and compact position detection system which is economical to produce for the machine.

This object is achieved by means of a position detection system for detecting a movement of a machine as described herein. The position detection system comprises a first position sensor for detecting a change in a first magnetic field which is generated by the movement of the machine, a second position sensor for detecting a change in a second magnetic field which differs from the first magnetic field and is generated by the movement of the machine, wherein a detection result from the second position sensor has a lower resolution of a position of an element of the machine to be determined than a detection result from the first position sensor, and an evaluation device for evaluating at least one detection result from the first position sensor and/or at least one detection result from the second position sensor for functionally determining the position of an element of the machine and for determining the position of the element according to predefined safety criteria, wherein each of the two position sensors is connected to the evaluation device via a separate communication connection in order to output its detection result to the evaluation device.

The position detection system is a very compact magnetic detection system which provides both positions of different quality and resolution for different functions and therefore also achieves a high safety level. In this case, the position detection system is very robust with respect to mechanical loads and environmental influences. The position detection system is also space-saving and economical to produce.

The position detection system has the great advantage that the position of the shaft of the machine and/or the position of a rotor of the machine can always be detected with a high degree of safety. In this case, two sensors which detect a movement of the shaft of the machine or the position of a rotor of the machine provide not only a safe incremental position but also a safe absolute position. In this case, the redundancy which is therefore present and is needed to form the safe incremental position can be used to detect errors in the safe absolute position.

Another advantage of the position detection system is its high reliability. As a result, the position detection system can be used, in particular, for rotating machines in which safe determination of the position is required.

Advantageous further configurations of the position detection system are specified in the dependent claims.

In one configuration, the position detection system also has at least two first magnets at which the first position sensor detects the first magnetic field, and a second magnet at which the second position sensor detects the second magnetic field, wherein the at least two first magnets and the second magnet are arranged in a predetermined fixed arrangement with respect to one another. In this case, the at least two first magnets have magnet pole pairs which are arranged in a row, wherein magnet poles of different polarity are respectively arranged beside one another, wherein the second magnet is arranged in a center of the at least two first magnets and at a distance from the multiplicity of magnet pole pairs arranged in a row.

According to one exemplary embodiment, the evaluation device has a control unit for evaluating at least one detection result from the first position sensor and at least one detection result from the second position sensor.

According to another exemplary embodiment, the evaluation device has a first control unit for evaluating at least one detection result from the first position sensor, and a second control unit for evaluating at least one detection result from the second position sensor, wherein the first and second control units are connected to one another in order to transmit the detection results or evaluation results as data between the control units.

The evaluation device is possibly configured to use the detection result from the second position sensor to determine the position within one electrical revolution of the element of the machine. The evaluation device is also possibly configured to use the detection result from the first position sensor to determine the position with respect to one mechanical revolution of the element of the machine. In this case, use is made of the fact that the second position sensor has a clear position within one mechanical revolution after the machine has been switched on, but the first position sensor does not. However, as a result of the described plausibility check of the two detection results from the sensors, an error of the second position sensor can be detected and a safe position within one revolution after switch-on can therefore be ensured.

The evaluation device can be configured to use the at least one detection result from the first position sensor and the at least one detection result from the second position sensor for error detection in an evaluation of the detection results from the position sensors.

According to one exemplary embodiment, more than one first position sensor is provided on a multiplicity of first magnets in order to detect a change in the first magnetic field.

It is conceivable for the first position sensor and the second position sensor to each be a TMR sensor, or for the first position sensor to be a TMR sensor and the second position sensor to be a parametrizable Hall sensor.

At least one position detection system described above can be part of a machine which also has at least one movable element which can be driven into a rotational movement using the machine, wherein the at least one position detection system is provided for detecting a movement of the at least one movable element. In this case, the at least one element of the machine is the rotor or the shaft of the machine. Additionally or alternatively, the machine is a synchronous motor.

At least one position detection system described above may be part of an installation also having at least one installation element to be driven and at least one machine for driving the at least one installation element to be driven into a rotational movement. In this case, the at least one position detection system is provided for detecting a movement of at least one element of a machine.

The object is also achieved by means of a method for detecting a movement of a machine using a position detection system as described herein. The position detection system has a first position sensor, a second position sensor and an evaluation device, wherein the method has the steps of: using the first position sensor to detect a change in a first magnetic field which is generated by the movement of the machine, and outputting the detection result to the evaluation device via a first communication connection, using the second position sensor to detect a change in a second magnetic field which differs from the first magnetic field and is generated by the movement of the machine, and outputting the detection result to the evaluation device via a second communication connection, wherein a detection result from the second position sensor has a lower resolution of a position of an element of the machine to be determined than a detection result from the first position sensor, and using an evaluation device to evaluate at least one detection result from the first position sensor and/or at least one detection result from the second position sensor for functionally determining the position of an element of the machine and for determining the position of the element according to predefined safety criteria.

The method achieves the same advantages as mentioned above with respect to the position detection system.

Further possible implementations of the disclosure also comprise not explicitly cited combinations of features or embodiments described above or below with respect to the exemplary embodiment. In this case, a person skilled in the art will also add individual aspects as improvements or additions to the respective basic form of the disclosure.

BRIEF DESCRIPTION OF THE DRAWINGS

The disclosure is described in more detail below with reference to the accompanying drawing and on the basis of exemplary embodiments. In the drawing.

In the figures, identical or functionally identical elements are provided with the same reference signs, unless stated otherwise.

DETAILED DESCRIPTION

Figure 1:
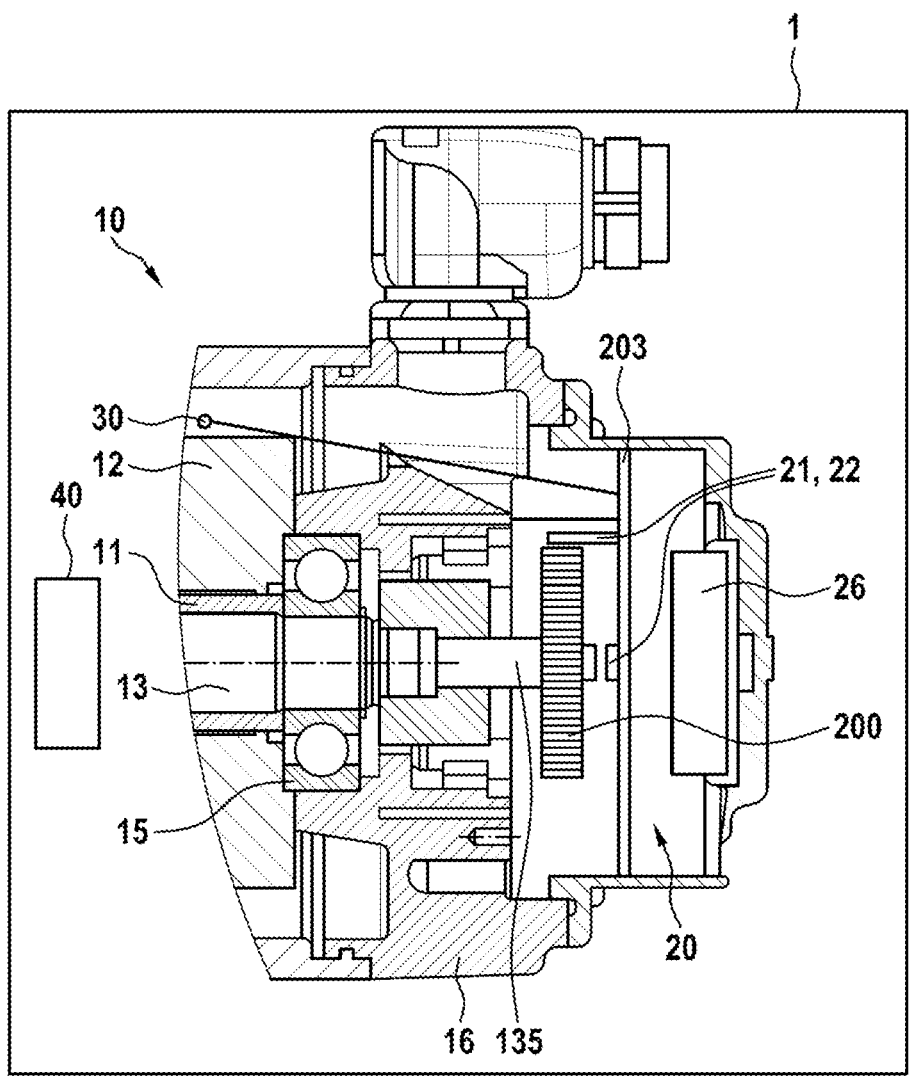
FIG. 1 shows a schematic view of an installation having a machine which is illustrated in a partial sectional view and to which a position detection system according to a first exemplary embodiment is fitted.

FIG. 1 shows an installation 1 having a machine 10, a position detection system 20, a winding temperature sensor 30 and an installation element 40 which can be moved by the machine 10.

The installation 1 may be or have a transport device for transporting an object, for example a robot having more than one machine 10, a conveyor belt, in which a rotating machine and/or a linear machine is/are used, etc. In particular, the installation 1 is or has, as a machine 10, a pump and/or a time switch. The installation 1 may alternatively have a machine 10 for a mixing mechanism. As a further alternative, the installation 1 may have a machine 10 for a rotary table drive. As a further alternative, the installation 1 may be a vehicle in which an alternator or another drive is provided as the machine 10, for example. Any other desired possible uses for the installation 1 are conceivable.

If corresponding magnetic fields are generated in the machine 10, a rotor 11 can be rotated relative to a stator 12 around a machine axis or shaft 13 on which the rotor 11 is mounted. The shaft 13 is rotatably mounted on a housing 16 of the machine 10 using bearings 15. The winding temperature sensor 30 can be used to detect the temperature of coil windings of the stator 12. In addition, further sensors are optionally present, for example a sensor detecting the ambient temperature and/or acceleration sensors, etc.

The position detection system 20 is provided and arranged on the machine 10 from FIG. 1 for the purpose of detecting the rotation of the shaft 13 and therefore also of the rotor 11. For this purpose, the position detection system 20 has two position sensors 21, 22 which can detect the movement of magnets on a magnet wheel 200. The magnet wheel 200 is permanently magnetically coupled to the shaft 13 at a magnetic decoupling unit 135. The magnetic decoupling unit 135 is produced from non-ferromagnetic material. As a result, the decoupling unit 135 causes magnetic decoupling even if there is mechanical coupling to the shaft 13. The position sensors 21, 22 are mounted on an electronic subassembly 203 of the position detection system 20. In addition to the functions described below, the electronic subassembly 203 is also configured to process the detection results from the winding temperature sensor 30.

The machine 10 is, in particular, one of the machines mentioned below, namely a motor, a generator, an AC machine, a three-phase machine, a hydraulic machine, a pneumatic machine, etc. However, the machine 10 need not be a rotating machine, but rather alternatively may be a linear machine in which a rotor moves linearly over a stator. In particular, the machine 10 is a synchronous motor or an asynchronous motor.

Figure 2:
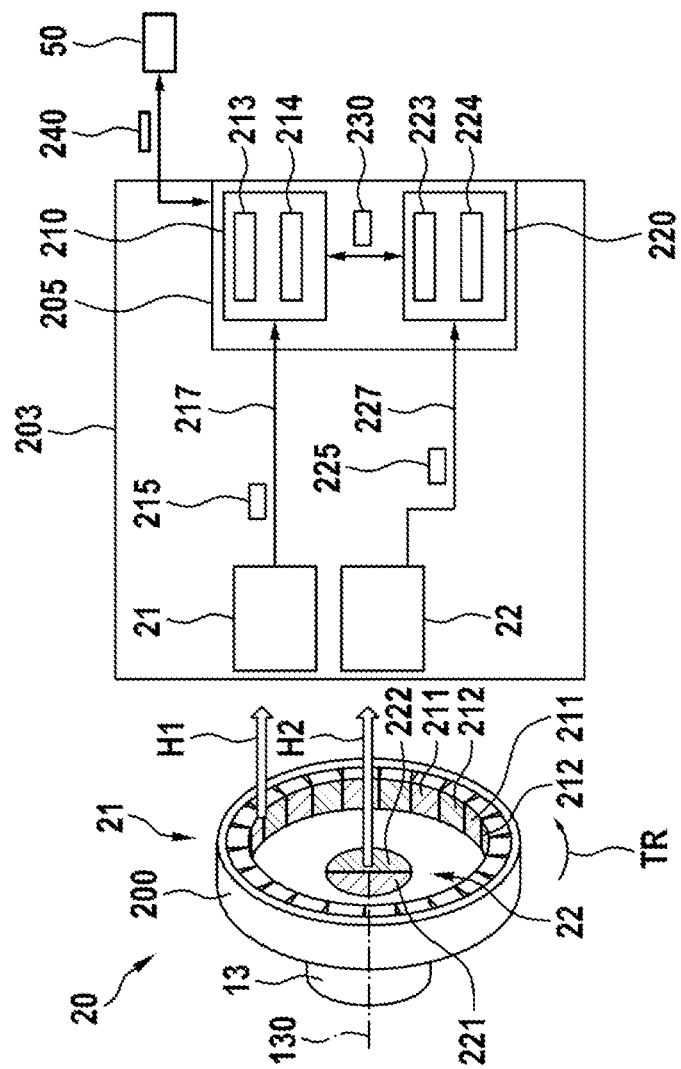
FIG. 2 shows a three-dimensional view of the position detection system together with its electrical structure in a block diagram according to the first exemplary embodiment.

FIG. 2 shows the structure of the position detection system 20 in more detail according to a special example. In this case, the mechanical structure of the position detection system 20 is shown on the left-hand side of FIG. 2. The position detection system 20 has the magnet wheel 200 which is arranged on the shaft 13.

The shaft 13 is rotatable about an axis of rotation 130. The axis of rotation 130 of the shaft 13 is the same as the axis of rotation of the magnet wheel 200 in the example from FIG. 2. Such an arrangement is optimized with respect to the lowest space requirement. If more space is available or is required by the application, the movement of the axis of rotation 130 can be alternatively tapped off from another shaft which is not shown here and is coupled to the axis of rotation 130, in particular via a transmission.

The electrical structure of the electronic subassembly 203 is illustrated on the right-hand side of FIG. 2 in a schematic block diagram. In addition to the first position sensor 21 and the second position sensor 22, the position detection system 20 has an evaluation device 205 having a first and a second control unit 210, 220 in the electronic subassembly 203.

The first position sensor 21 is in the form of an incremental sensor having a multiplicity of magnets 211, 212 with first magnet poles 211 and second magnet poles 212 which repel one another or have a different polarity. The magnets 211, 212 of the first position sensor 21, more precisely their first and second magnet poles 211, 212, are alternately arranged along the circumference of the magnet wheel 200 on an inner wall of the magnet wheel 200 in FIG. 2. Alternatively, however, it is possible to arrange the first and second magnet poles 211, 212 alternately along the circumference of the magnet wheel 200 on an outer wall of the magnet wheel 200. For the sake of clarity, not all magnet poles 211, 212 are provided with a reference sign in FIG. 2. In the present exemplary embodiment, the first position sensor 21 is an angle sensor. For example, an angle sensor has two magnetic sensors which are mounted in a chip in a manner offset by approximately 90°. Alternatively, an angle sensor has two magnetic sensors which are mounted on a printed circuit board in a manner offset by approximately 90°. However, all other embodiments for an angle sensor which can detect an angle are conceivable.

The first position sensor 21 may be in the form of a magnetic field detector which is, in particular, a TMR (tunnel magnetoresistance) sensor.

The number of pairs of first and second magnet poles 211, 212 of the first position sensor 21 determines the resolution with which the position of the shaft 13 can be detected during its rotation about the axis of rotation 130. In the present example, 11 pairs of first and second magnet poles 211, 212 are provided. The more pairs of first and second magnet poles 211, 212, the greater the detection resolution. In addition, the more pairs of first and second magnet poles 211, 212, the higher the quality and the higher the resolution that can be achieved, in other words, the better an incremental position evaluation can be carried out using the first control unit 210.

If the first position sensor 21 detects a change in a magnetic field H1 at the magnet 221, 222, the first position sensor 21 outputs its detection results or its signal 215 to the first control unit 210. The detection results or the signal 215 is/are detected by the first position sensor 21 at a predetermined clock rate or at predetermined intervals of time and is/are transmitted to the first control unit 210. The sensor 21 is possibly in the form of a sensor which outputs an analog signal as detection results 215. Alternatively, the sensor 21 may be in the form of a sensor which outputs a digital signal as detection results 215.

A magnet 221, 222 of the second position sensor 22 is arranged in the center of the magnet wheel 200. The magnet 221, 222 has a first magnet pole 221 and a second magnet pole 222 which repel one another or have a different polarity. In the example from FIG. 2, the magnet 221, 222 is a round magnet. The magnet 221, 222 of the second position sensor 22 is also arranged in the center of the magnets 211, 212 of the first position sensor 21. The center of the magnet 221, 222 and the center of the shaft 13 are the same in the example from FIG. 2. In the present exemplary embodiment, the second position sensor 22 is an angle sensor which can be configured as described above for the first position sensor 21. The second position sensor 22 may be in the form of a magnetic field detector which is, in particular, a TMR (tunnel magnetoresistance) sensor.

If the second position sensor 22 detects a change in a magnetic field H2 at the magnet 221, 222, the second position sensor 22 outputs its detection results or its signal 225 to the second control unit 220 via a communication line 227. In this case, the detection results or the signal 225 is/are detected by the second position sensor 22 at a predetermined clock rate or at predetermined intervals of time and is/are transmitted to the second control unit 220. The sensor 22 is possibly in the form of a sensor which outputs an analog signal as detection results 225. Alternatively, the sensor 22 may be in the form of a sensor which outputs a digital signal as detection results 225.

In the case of a linear machine, a multiplicity of magnets 211, 212 which are lined up in a row along the length of a stator of the linear machine can be used instead of a magnet wheel 200. In such a case, the first and second position sensors 21, 22 are length detection sensors. In this case, as many division periods per unit length as possible are required.

The first control unit 210 is, in particular, a microcontroller having a central processing unit (CPU) 213 and at least one storage unit 214. In addition, the second control unit 220 is, in particular, a microcontroller having a central processing unit (CPU) 223 and at least one storage unit 224.

The evaluation device 205 has the control units 210, 220. The first control unit 210 forms a first channel of a two-channel processor system. The second control unit 220 forms a second channel of a two-channel processor system. The control units 210, 220 are connected to one another, with the result that data 230 can be transmitted between the control units 210, 220. As a result, each of the control units 210, 220 can use the detection results or signals 215, 225 from both sensors 21, 22 in its evaluation. In addition, the evaluation result from the control units 210, 220 can be transmitted as data 230 between the control units 210, 220, with the result that each control unit 210, 220 can also access it.

In the present exemplary embodiment, the evaluation device 205 is part of the machine 10. Alternatively, at least one of the control units 210, 220 may be provided outside the machine 10. In addition, the evaluation device 205 is connected to an external apparatus 50 which is a control center (host), for example. The evaluation device 205 is configured to transmit the above-mentioned evaluation results in data 240 to the external apparatus 50. The evaluation results and therefore the data 240 comprise the absolute position or the safe absolute position, depending on the result of the evaluation.

The position detection system 20 therefore provides detection of the absolute position of the shaft 13 or of the rotor 11 using the second position sensor 22 and the evaluation of the absolute position of the shaft 13 or of the rotor 11 using the second control unit 220. Only the second control unit 220 can provide an absolute position within one revolution using the second position sensor 22. Although the first control unit 210 receives the absolute position from the second control unit 220, it cannot determine the absolute position itself. In each of the control units 210, 220, the received detection result or the signal 215, 225 can also be used to detect the direction in which the shaft 13 moves as the element of the machine 10.

On the other hand, the position detection system 20 also provides incremental position detection by means of the first position sensor 21 and incremental position evaluation by means of the first control unit 210, which is required for the high-resolution position. In this case, the absolute position detection, which is understood in the sense of an individual revolution (single turn) in the present application, by means of the second position sensor 22 and the high-resolution position detection by means of the first position sensor 21 form an overall system. In the overall system, the absolute position detection and the high-resolution position detection are systems which are dependent on one another.

For a synchronous motor in particular, the determined position from the second position sensor 22 can be used to control the location of the element 11, 13 and to enable the optimum commutation angle for controlling the power electronics of the electronic subassembly 203. The power electronics may be part of the electronic subassembly 203 or may be provided outside the electronic subassembly 203. The position of the shaft 13 within one electrical revolution of the machine 10 can be clearly determined using the second position sensor 22 and the control unit 220. The determined position is completely sufficient to control the location of a synchronous motor. In this case, one electrical revolution of 360° corresponds to one mechanical revolution via a pole of a pole pair of the stator of the electrical machine 10. If two pole pairs, for example, are provided on the stator in the machine 10, an electrical revolution of 360° results for each mechanical revolution of 180°. If three pole pairs are provided, an electrical revolution of 360° results for each mechanical revolution of 120°, etc.

Therefore, the position formed using the second position sensor 22 is used to clearly have available the position within one electrical revolution of the machine 10 without further activities after switch-on.

For a high quality and resolution of the position, the first position sensor 21 is configured in such a manner that as many division periods per mechanical revolution as possible are available. For this purpose, the first position sensor 21 has the required number of magnets 211, 212. In linear position detection systems, as many division periods per unit length as possible are provided.

The advantage of this design is that both the individual revolution position (single-turn information) and a high-resolution position can be formed.

However, in safety technology, a high resolution of the position is not required. The resolution which is achieved using the second position sensor 22 suffices to determine a position.

A redundant position is therefore available with the two position sensors 21, 22, which redundant position is needed to safely monitor the speed/position. Depending on requirements, the safe position or speed can be used when controlling the location for a machine 10, in particular a synchronous motor.

A high safety level can be achieved since two control units 210, 220 which are configured as described above are present in the example from FIG. 2. According to a safety level, safety criteria predefined according to technical regulations for operating technical installations should be complied with.

Safe two-channel and therefore redundant detection or determination of the position is therefore possible without additional hardware. This redundancy can be used to detect errors in the safe absolute position which is detected using the second position sensor 22. In this case, the two detection results or signals 215, 225 from the two sensors 21, 22 can be compared with one another using a predetermined comparison rule. If the detection results or signals 215, 225 provide results for the position which differ from one another, the evaluation device 205 identifies the position result as an error. If an error is detected, the evaluation device 205 can output an error message. In order to detect the error, a tolerance window which takes into account the differences resulting from noise can be placed via the monitoring described above. An error can arise, for example, as a result of a magnet 211, 212 or the magnet 221, 222 being detached from the magnet wheel 200.

The evaluation device 205 can therefore evaluate at least one detection result from the first position sensor 21 and at least one detection result from the second position sensor 22 for functionally determining the position of an element 11, 13 of the machine 10. A function is, for example, the fact that the position within one electrical revolution of the element 11, 13 of the machine 10 should be determined, as described above. For this purpose, the evaluation device 205 preferably uses the detection result from the second position sensor 22, which result contains the single-turn information and provides the lower resolution. The detection result from the first position sensor 21, which provides the high or higher resolution, is also used. Both positions are combined and then result in an item of information.

The described type of position determination reveals that both sensors 21, 22 form a two-channel system (redundancy). If an impermissible deviation is determined, the transmission of the safe position is stopped and an error message is output.

The advantage of such a design and configuration of the position detection system 20 is that the components, such as the second position sensor 22 and the control unit 220, which are used to form a safe absolute position of the shaft 13 or of the rotor 11 can also be used to form a safe incremental position.

Figure 3:
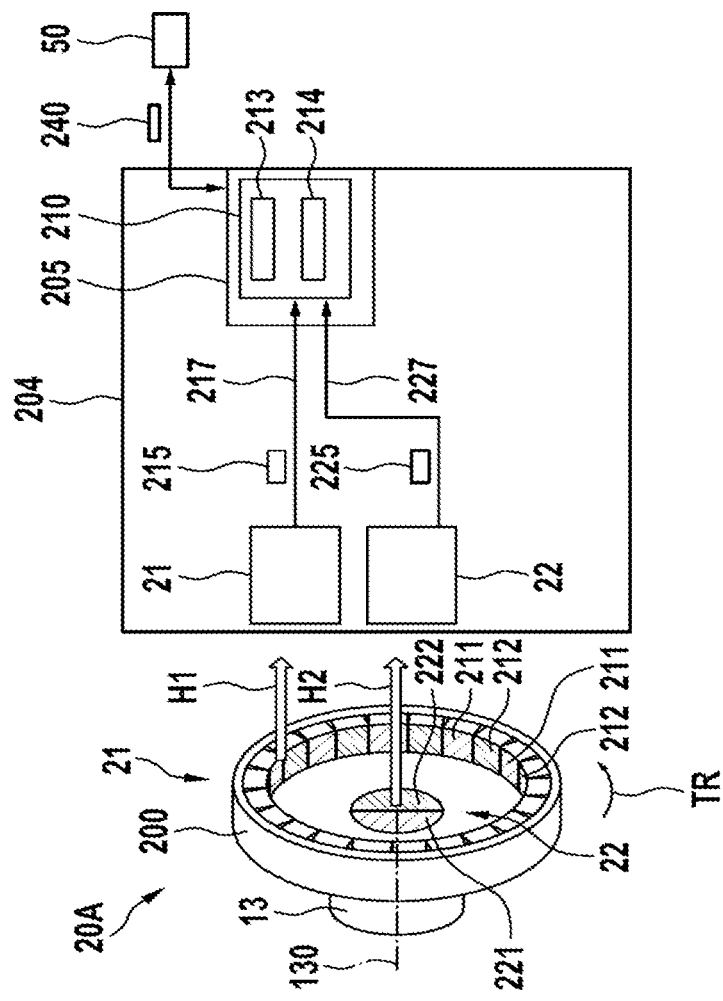
FIG. 3 shows a three-dimensional view of the position detection system together with its electrical structure in a block diagram according to a second exemplary embodiment.

FIG. 3 shows a position detection system 20A according to a second exemplary embodiment. In this case, in contrast to the first exemplary embodiment, only one control unit, namely the first control unit 210 for example, is present on an electronic subassembly 204. In this case, both position sensors 21, 22 transmit their detection results to the one control unit, that is to say the first control unit 210 here. The one control unit 210 also carries out the necessary evaluations of the detection results or signals 215, 225, as described above with respect to the first exemplary embodiment.

Since there is therefore no completely two-channel system, the safety level which can be achieved is lower than in the position detection system 20 according to the first exemplary embodiment.

According to a third exemplary embodiment, instead of the one first position sensor 21, a plurality of position sensors may be present in order to detect the magnetic field H1 of the magnets 211, 212 of the magnet wheel 200 or a change in the magnetic field H1 and to provide a detection result or signal 215 for the evaluation device 205. The resolution and quality of the determination of the position of the shaft 13 can therefore be increased even further.

Depending on the required safety level, the detection results or the signal 215 from the various first position sensors 21 can be transmitted separately to the evaluation device 205. In addition, depending on the required safety level, the evaluation device 205 may have different control units 210 in order to separately evaluate the detection results or the signal 215 from the first position sensors 21. A communication connection for transmitting data 230 between the individual control units 210 may be additionally present.

All of the above-described configurations of the installation 1, the position detection system 20, 20A and the method carried out by the latter can be used individually or in all possible combinations. In particular, all features and/or functions of the exemplary embodiments described above can be combined in any desired manner. The following modifications are additionally conceivable, in particular.

The parts illustrated in the figures are schematically illustrated and can differ from the forms shown in the figures in the exact configuration as long as their functions described above are ensured.

At least one of the communication lines 217, 227 is possibly in the form of a serial bus, in particular an I$^2$C bus.

The at least one first position sensor 21 can additionally or alternatively be a parametrizable Hall sensor. As a result, the first position sensor 21 can be adapted to a wide variety of applications.

What is claimed is:

1. A position detection system for detecting a movement of a machine, comprising:
   a first position sensor configured to detect a change in a first magnetic field generated by the movement of the machine;
   a second position sensor configured to detect a change in a second magnetic field, the second magnetic field differing from the first magnetic field, and the second magnetic field generated by the movement of the machine, wherein a detection result from the second position sensor has a lower resolution of a position of an element of the machine to be determined than a detection result from the first position sensor, and
   an evaluation device configured to evaluate the detection result from the second position sensor to determine the position of the element of the machine within one electrical revolution, and to use the detection result from the first position sensor to identify an error of the second position sensor, wherein:
   the first position sensor and the second position sensor are connected to the evaluation device via a separate communication connection in order to output the corresponding detection results to the evaluation device,
   the evaluation device comprises
      a first control unit configured to evaluate the detection result from the first position sensor, and
      a second control unit configured to evaluate the detection result from the second position sensor;
   the first and second control units are connected to one another in order to transmit the corresponding detection results or evaluation results as data between the first and the second control units; and
   only the second control unit is configured to determine an absolute position of the element of the machine.

2. The position detection system according to claim 1, further comprising:
   at least two first magnets at which the first position sensor detects the change in the first magnetic field; and
   a second magnet at which the second position sensor detects the change in the second magnetic field,
   wherein the at least two first magnets and the second magnet are arranged in a predetermined fixed arrangement with respect to one another.

3. The position detection system according to claim 2, wherein:
   the at least two first magnets have magnet pole pairs arranged in a row,
   magnet poles of different polarity are respectively arranged beside one another, and
   the second magnet is arranged in a center of the at least two first magnets and at a distance from the magnet pole pairs arranged in a row.

4. The position detection system according to claim 2, wherein more than one first position sensor is provided on a plurality of the first magnets to detect the change in the first magnetic field.

5. The position detection system according to claim 1, wherein the evaluation device has a control unit configured to evaluate the detection result from the first position sensor and the detection result from the second position sensor.

6. The position detection system according to claim 1, wherein:
   the evaluation device is configured to use the detection result from the first position sensor to determine an incremental position; and
   the evaluation device is configured to use the detection result from the second position sensor to determine the absolute position of the element of the machine.

7. The position detection system according to claim 1, wherein the evaluation device is configured to use the detection result from the first position sensor and the detection result from the second position sensor for error detection of the first position sensor.

8. The position detection system of claim 7, wherein the evaluation unit is further configured to output an error signal when at least one of an error of the second position sensor and an error of the first position sensor is identified.

9. The position detection system according to claim 1, wherein:
   the first position sensor is a tunnel magnetoresistance sensor and the second position sensor is a parametrizable Hall sensor.

10. A machine comprising:
    at least one movable element configured to be driven to move using the machine; and
    at least one position detection system configured to detect the movement of the at least one movable element, the at least one position detection system including (i) a first position sensor configured to detect a change in a first magnetic field generated by the movement of the machine, (ii) a second position sensor configured to detect a change in a second magnetic field, the second magnetic field differing from the first magnetic field, and the second magnetic field generated by the movement of the machine, wherein a detection result from the second position sensor has a lower resolution of a position of an element of the machine to be determined than a detection result from the first position sensor, and (iii) an evaluation device configured to evaluate the detection result from the second position sensor to determine the position of the element of the machine within one electrical revolution, and to use the detection result from the first position sensor to identify an error of the second position sensor, wherein:

the first position sensor and the second position sensor are connected to the evaluation device via a separate communication connection in order to output the corresponding detection results to the evaluation device;

the evaluation device comprises
- a first control unit configured to evaluate the detection result from the first position sensor, and
- a second control unit configured to evaluate the detection result from the second position sensor;

the first and second control units are connected to one another in order to transmit the corresponding detection results or evaluation results as data between the first and the second control units; and only the second control unit is configured to determine an absolute position of the element of the machine.

11. The machine according to claim 10, wherein:
the at least one movable element is a rotor or a shaft of the machine, and/or
the machine is a synchronous motor.

12. The machine according to claim 10, wherein:
the machine and an installation element configured to be driven are included in an installation, and
the machine is configured to drive the installation element into a rotational movement or a linear movement.

13. The machine of claim 10, wherein the evaluation unit is further configured to identify an error of the first position sensor using the detection result from the second position sensor.

14. The machine of claim 13, wherein the evaluation unit is further configured to output an error signal when at least one of an error of the second position sensor and an error of the first position sensor is identified.

15. A method for detecting a movement of a machine using a position detection system having a first position sensor, a second position sensor, and an evaluation device, comprising:
detecting a change in a first magnetic field with the first position sensor, the first magnetic field generated by the movement of the machine;
outputting a detection result from the first position sensor to the evaluation device via a first communication connection;
detecting a change in a second magnetic field with the second position sensor, the second magnetic field differing from the first magnetic field and the second magnetic field generated by the movement of the machine;
outputting a detection result from the second position sensor to the evaluation device via a second communication connection, wherein the detection result from the second position sensor has a lower resolution of a position of an element of the machine to be determined than the detection result from the first position sensor;
evaluating the detection result from the second position sensor to determine the position of the element of the machine within one electrical revolution; and
using the evaluation device to identify an error of the second position sensor using the detection result from the first position sensor, wherein:
the evaluation device comprises
- a first control unit configured to evaluate the detection result from the first position sensor, and
- a second control unit configured to evaluate the detection result from the second position sensor;

the first and second control units are connected to one another in order to transmit the corresponding detection results or evaluation results as data between the first and the second control units; and only the second control unit is configured to determine an absolute position of the element of the machine.

16. The method of claim 15, further comprising:
using the evaluation device to identify an error of the first position sensor using the detection result from the second position sensor.

17. The method of claim 16, further comprising:
using the evaluation device to output an error signal when at least one of an error of the second position sensor and an error of the first position sensor is identified.

* * * * *